United States Patent
Kim et al.

(10) Patent No.: US 8,085,270 B2
(45) Date of Patent: Dec. 27, 2011

(54) APPARATUS FOR PROCCESSING DRAWN-BY-HUMAN-HAND EFFECT USING STYLE LINES

(75) Inventors: Bo Youn Kim, Daejeon (KR); Bon Ki Koo, Daejeon (KR); Ji Hyung Lee, Daejeon (KR); Hee Jeong Kim, Daejeon (KR); Il Kyu Park, Daejeon (KR); Yoon-Seok Choi, Daejeon (KR); Seung Wook Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 663 days.

(21) Appl. No.: 12/243,533

(22) Filed: Oct. 1, 2008

(65) Prior Publication Data
US 2009/0153578 A1    Jun. 18, 2009

(30) Foreign Application Priority Data
Dec. 17, 2007    (KR) .................. 10-2007-0132678

(51) Int. Cl.
*G06T 11/20*        (2006.01)
(52) U.S. Cl. ........................................ 345/441
(58) Field of Classification Search .......... 345/441, 345/442, 443
See application file for complete search history.

(56) References Cited

U.S. PATENT DOCUMENTS

| | | | |
|---|---|---|---|
| 5,594,853 | A * | 1/1997 | Salesin et al. ............ 345/441 |
| 6,608,627 | B1 | 8/2003 | Marshall et al. |
| 7,061,501 | B1 | 6/2006 | Lake |

FOREIGN PATENT DOCUMENTS
JP    2004-054584    2/2004

OTHER PUBLICATIONS

Korean to English machine translation of Notice of Allowance dated May 27, 2009, for Korean application No. 10-2007-0132678.*
Stylized Haloed Outlines on the GPU, Jorn Loviscach, SIGGRAPH 2004 Poster.
Rendering Optimisations for Stylised Sketching, Holger Winnemoller et al., 2003 ACM p. 117-122.

* cited by examiner

*Primary Examiner* — Jeffery A Brier
(74) *Attorney, Agent, or Firm* — Lowe Hauptman Ham & Berner LLP

(57) ABSTRACT

An apparatus for processing an effect using style lines, includes a contour line creation unit for creating contour lines using polygons of a three-dimensional (3D) object and location information of a camera; a style line creation unit for putting edge lists, extracted at the time of creating the contour lines, into groups, and creating one or more style lines for each of the groups; and an effect processing unit for representing a line style by inserting the created style lines inside and outside a contour line corresponding to the group. Therefore, representation to appear to have been drawn by a human hand is enabled by adding style lines to existing contour lines in order to represent a line style that belongs to various styles of non-photo realistic rendering.

14 Claims, 4 Drawing Sheets

APPARATUS FOR PROCCESSING DRAWN-BY-HUMAN-HAND EFFECT USING STYLE LINES

CROSS-REFERENCE(S) TO RELATED APPLICATIONS

The present invention claims priority of Korean Patent Application No. 10-2007-0132678, filed on Dec. 17, 2007, which is incorporated herein by reference.

FIELD OF THE INVENTION

The present invention relates to an apparatus for processing an effect using style lines, which is used to realize the effect of appearing to have been drawn by a human hand at the time of representing a line style in the field of non-photo realistic rendering.

This work was supported by the IT R&D program of MIC/IITA. [2005-S-082-03, Development of Non-Photorealistic Animation Technology]

BACKGROUND OF THE INVENTION

In general, contour lines for determining a model of a three-dimensional (3D) object are calculated using 3D information. A contour line determines one reference face, and uses the neighboring information of the face. The scalar products between normal information of the face and normal information of neighboring faces are calculated, and neighboring faces, having a negative scalar product value, are determined. Edges that are boundaries between determined neighboring faces and the reference face are edges that are a contour.

The above-described method is a well-known silhouette determination algorithm. Edges calculated as described above are stored in a data structure. A silhouette includes edges that are a boundary between a front face and a back face.

Meanwhile, the prior art related to a method of realistically representing a line style will be described below.

The prior art technology for representing a line style includes "Stylized Haloed Outlines on the GPU," authored by "Jörn Loviscach" and published in "SIGGRAPH 2004 Poster." According to the prior art, outlines are extracted from a 3D model, and transparency is adjusted by adjusting an alpha value by a value corresponding to a specific thickness in the areas around the outlines in order to make the break between a visible line and an invisible line natural. Curved lines are formed by slightly modifying silhouette curves in order to realize natural representation which appears to have been drawn by a human hand. In order to realize the effect in which a plurality of lines appears to have been drawn in an overlay fashion, color values are modified at texture coordinates using Perlin noise textures. The prior art technology proposes a method that has a high speed due to the use of a Graphics Processing Unit (GPU)-based rendering technique, and can create images that appear to have been drawn by a human hand.

Korean Laid-open Patent Publication No. 2007-0019953 entitled "Apparatus and Method for Representing Relative Location of Moving Object" discloses a method of calculating the relative motion of an object using the intensity of radio waves or radio wave propagation time.

U.S. Pat. No. 7,061,501, entitled "Rendering a Pencil-Sketch Image," discloses a method of projecting 3D data onto a two-dimensional surface, mapping a pencil-sketch texture, and finally creating a pencil-sketch image.

As described above, a lot of research into the representation of the effect of appearing to have been drawn by a human hand at the time of representing a line style in the field of non-photo realistic rendering has been conducted.

SUMMARY OF THE INVENTION

It is, therefore, an object of the present invention to provide an apparatus that, with an eye on the fact that a human does not create a long line without an intermediate break when drawing a picture, is configured to put successive edges into a group having a certain length and to use the group, that is, the apparatus is configured to sequentially compare neighboring edges with each other from the start one of successive edges and to determine edges, ranging to an edge having a rapid change in angle, to be a single group.

Furthermore, the present invention creates a natural line by slightly curving a rectilinear line in order to represent an existing contour line as a smooth line while maintaining the shape of the contour line.

The present invention considers edges, put into a single group, to be a single line, determines both end points and an intermediate point of the line to be control points, determines the shape of a rectilinear line using the three control points, and creates a curve based on the three control points in consideration of the curvature between the two end points.

In accordance with the present invention, there is provided an apparatus for processing an effect using style lines, including: a contour line creation unit for creating contour lines using polygons of a three-dimensional (3D) object and location information of a camera; a style line creation unit for putting edge lists, extracted at the time of creating the contour lines, into groups, and creating one or more style lines for each of the groups; and an effect processing unit for representing a line style by inserting the created style lines inside and outside a contour line corresponding to the group.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art. Furthermore, if, in the following description of the present invention, detailed descriptions of well-known functions or constructions may unnecessarily make the gist of the present invention obscure, such detailed descriptions will be omitted.

An embodiment of the present invention describes a method of realizing the effect of appearing to have been drawn by a human hand in such a way as to add style lines, newly created using contour lines except a contour line best representing the appearance of an object, to the outside and inside the contour line.

Figure 1:
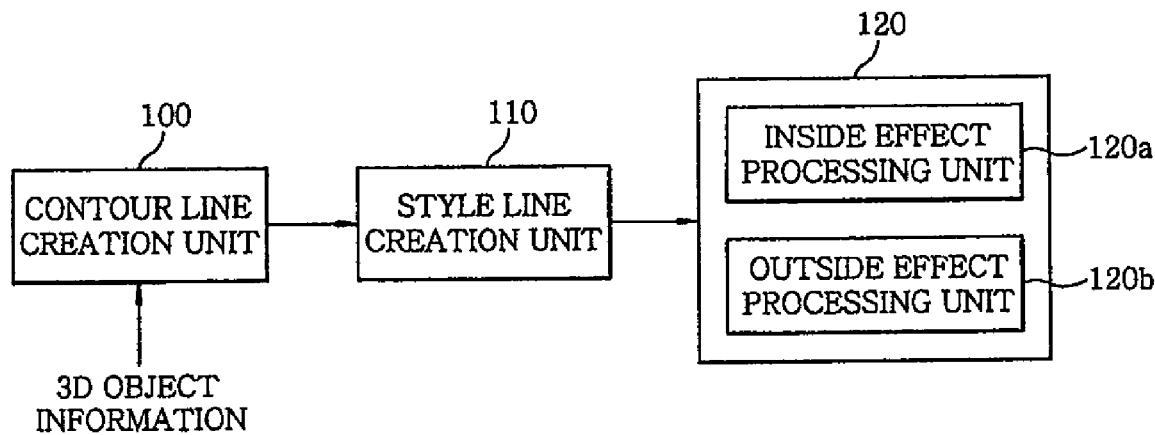
FIG. 1 is a block diagram showing an apparatus for processing an effect using style lines in order to realize a natural sketch in accordance with an embodiment of the present invention.

FIG. 1 is a block diagram showing an apparatus for processing an effect using style lines in order to realize a natural sketch in accordance with an embodiment of the present invention. The apparatus for processing an effect includes a contour line creation unit 100 for calculating contour lines based on the location of the vertex of a 3D object, the normal information of a face and neighboring information between faces using the 3D object as input data, a style line creation unit 110, and an effect processing unit 120. The effect processing unit 120 includes an inside effect processing unit 120*a* and an outside effect processing unit 120*b*.

The contour line creation unit 100 puts edges into groups using the geometric structure of 3D data, considers one group to be one line, creates contour lines by modifying the lines (that is, creates contour lines using the polygons of a 3D object in a 3D space and location information of a camera), and performs rendering on the outside and the inside.

Figure 2:
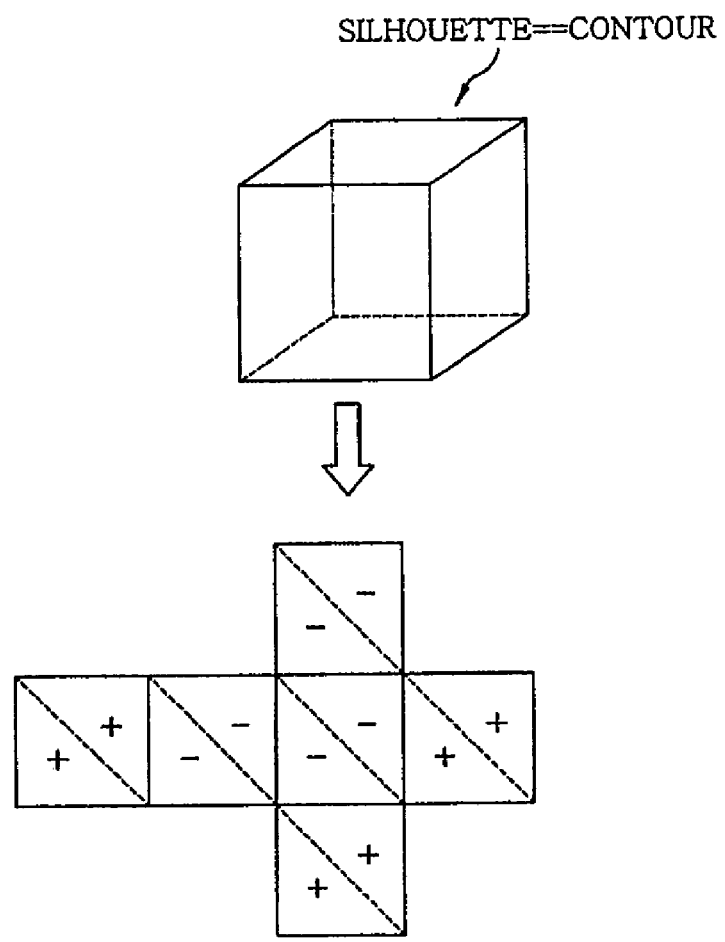
FIG. 2 is a diagram illustrating a method of obtaining contour lines in a 3D model.

That is, as shown in FIG. 2, the contour line creation unit 100 creates a contour line with a negative scalar product value, by calculating the location of the vertex of a 3D object, the normal information of a face, and the scalar products between the normal values of a face and its neighboring face using the 3D object as input data. In general, an edge list is obtained to create a contour line, and the edge list is input to the style line creation unit 110.

The style line creation unit 110 arranges the edge list, obtained at the time of creating the contour line, in the form of a continuous edge list, calculates the angle between a first edge and a second edge among successive edges, and calculates the angle between the second edge and a third edge. That is, the angles between neighboring edges are calculated, and edges, ranging to an edge for which a calculated value exceeds a threshold value, are reconstructed into a single group.

Figure 3A:
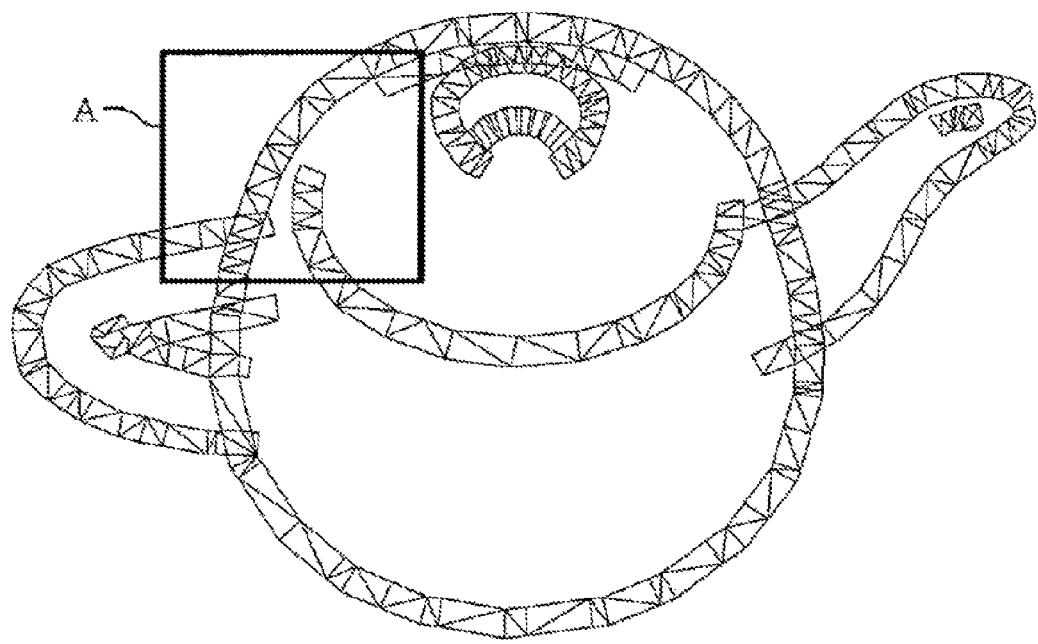
FIG. 3A is a diagram illustrating a method of reconstructing of a contour line into a line having a certain length.
Figure 3B:
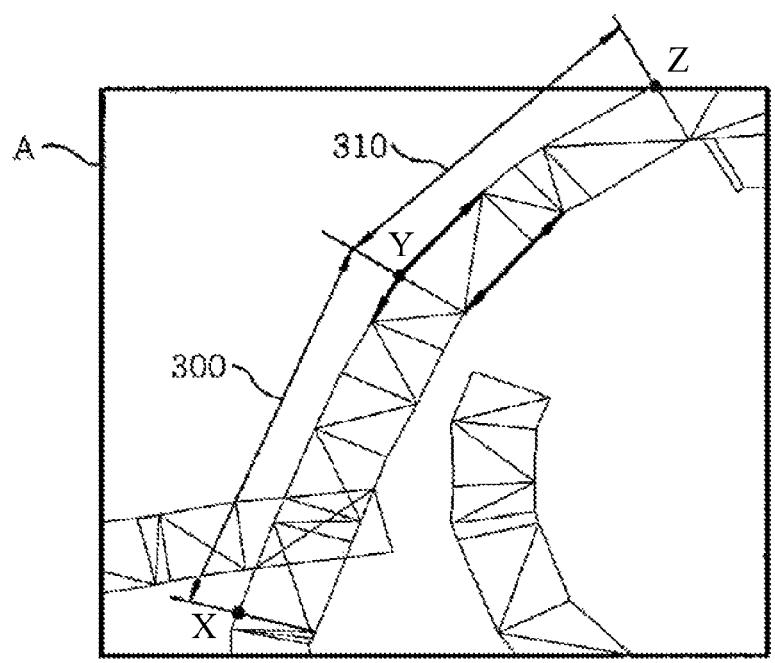
FIG. 3B is an enlarged view of portion 'A' in FIG. 3A.

FIG. 3A is a diagram of polygons that constitute silhouette edges of a 3D object model (e.g., a tea pot) according to a predetermined camera position. FIG. 3B is an enlarged view of portion 'A' in FIG. 3A. In some embodiments, the style line creation unit 110 sets sections for which angles exceed the preset threshold value, that is, a section ranging from point X to point Y and a section ranging from point Y to Point Z, as a first group 300 and a second group 310, respectively, during the calculation of the angles between neighboring edges.

Grouping is performed by applying the above-described process to all the edges that constitute a silhouette.

Figure 4A:
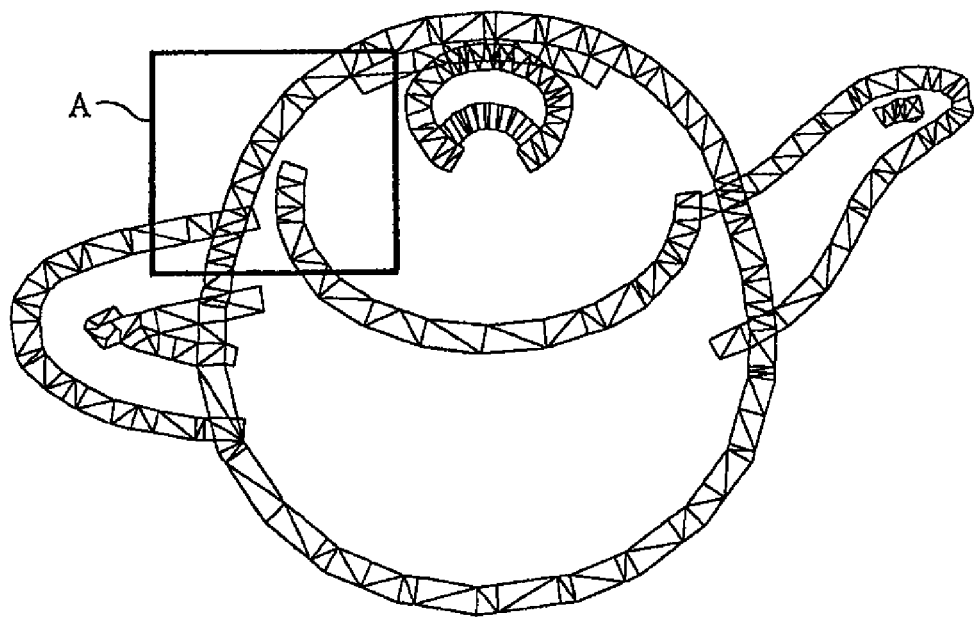
FIG. 4A is a diagram illustrating a method of creating style lines, that is, smooth lines, in accordance with the present invention.
Figure 4B:
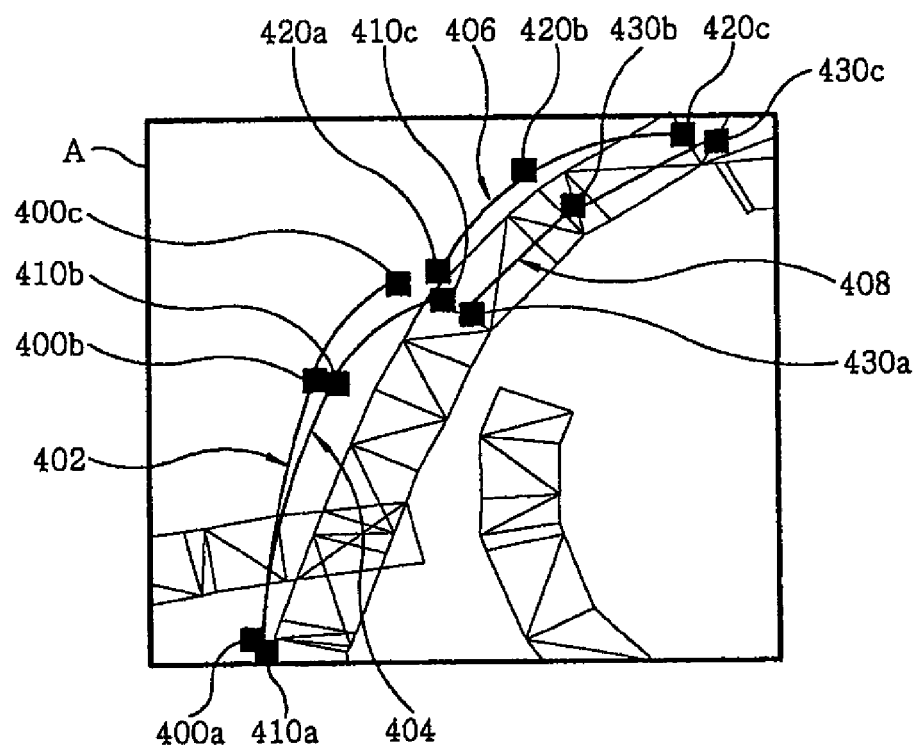
FIG. 4B is an enlarged view of portion 'A' in FIG. 4A.

FIG. 4A is a diagram of polygons that constitute silhouette edges of a 3D object model (e.g., a tea pot) according to a predetermined camera position. FIG. 4B is an enlarged view of portion 'A' in FIG. 4A.

The style line creation unit 110 considers the reconstructed group to be a single line, and performs the work of smoothing lines. Arbitrary points are set as control points for each group, and style lines, which are natural lines, are created for each group based on the control points. For example, as shown in FIG. 4B, start points 400*a* and 410*a*, or 420*a* and 430*a*, end points 400*c* and 410*c*, or 420*c* or 430*c*, and intermediate points 400*b* and 410*b*, or 420*b* and 430*b* are set as control points for each group, and natural curves, that is, style lines 402 and 404, or 406 and 408, are created for each group. In this case, the style line creation unit 110 creates each style line in consideration of the curvature between both end points (a start point and an end point) based on three control points at the time of creating the style line, and provides a user interface capable of setting the slope and length of the style line. The slope and length of the style line are determined based on the information set by the user interface.

The effect processing unit 120 represents a line style by inserting one or more style lines having various lengths and intervals, created by the style line creation unit 110, around a contour line.

The number of lines at the time of representing a line style is determined based on light and curvature, that is, based on brightness/darkness and the value of a curvature, which are calculated based on light information and the location information of each point in each edge group. That is, a large number of style lines are drawn in a region having a large curvature value or a dark region, while about one or two style lines are drawn in the other regions.

Here, the number of style lines to be inserted around a contour line may be controlled on the basis of a setting made by a user. In some embodiments, the style line creation unit 110 provides a user interface capable of setting a number and length of style lines, and creates the style lines based on the number and length set by the user interface.

The effect processing unit 120 is divided into an inside effect processing unit 120*a* and an outside effect processing unit 120*b* depending on the location at which a style line is inserted. That is, when a style line is inserted inside a contour line, a line style is represented using the inside effect processing unit 120*a*. In contrast, when a style line is inserted outside a contour line, a line style is represented using the outside effect processing unit 120*b*.

The inside effect processing unit 120*a* inserts one or more style lines, the length of which is randomly determined within the maximum value, to which the sum of edges, constituting the style line, is set, inside the contour line. The style lines, created inside the contour line, are lines that represent brightness/darkness, and are differently represented for bright and dark regions. That is, only a basic style line is created in a bright region due to the amount of light, while a plurality of style lines is created at short intervals in the dark region. In this case, the created style lines have a random length, and no style line may be created in the bright region.

Figure 5A:
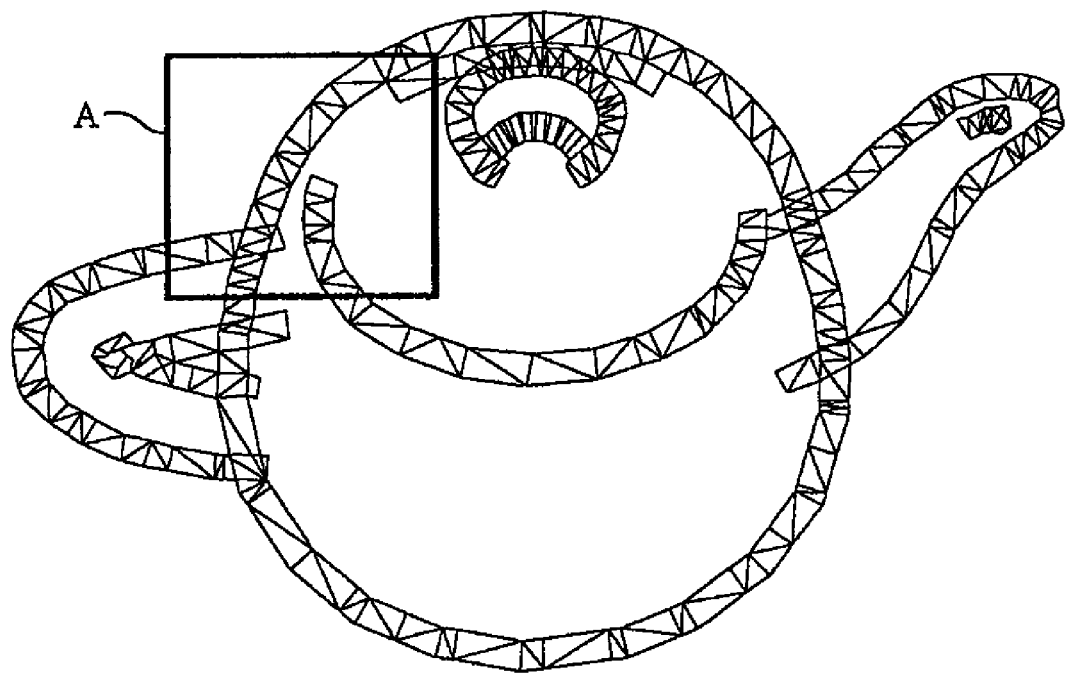
FIG. 5A is a diagram illustrating a method of determining the location at which a style line in accordance with the present invention will be drawn.
Figure 5B:
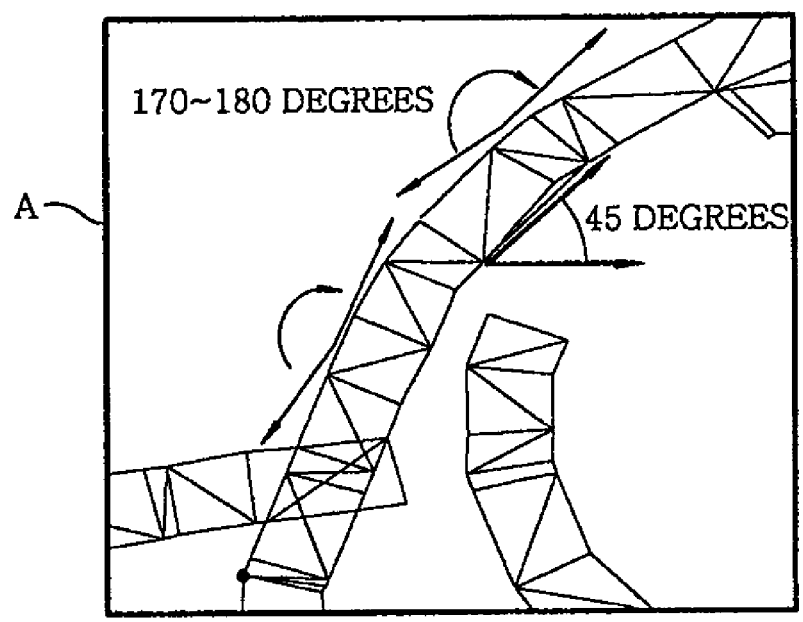
FIG. 5B is an enlarged view of portion 'A' in FIG. 5A.

FIG. 5A is a diagram of polygons that constitute silhouette edges of a 3D object model (e.g., a tea pot) according to a predetermined camera position. FIG. 5B is an enlarged view of portion 'A' in FIG. 5A. The style line, to be created inside the contour line, as shown in FIG. 5B, is created at an angle that is preset with respect to the starting point of an edge group, for example, at an angle of 45 degrees. In the dark region, a plurality of style lines having random lengths is created.

According to the present invention, contour lines, representative of the shape of an object, are calculated using 3D information, and, then, contour lines are put into groups by the length thereof using the curvature information of the lines in order to realize the effect of appearing to have been drawn by a human hand, style lines are created by applying different values to respective groups and the style lines are inserted inside and outside the contour lines, thereby realizing the effect of appearing to have been drawn by a human hand in the representation of a line style.

The outside effect processing unit 120b, as shown in FIG. 5B, creates two or three style lines by readjusting the control points of the style line. In this case, when the angle formed with the contour line falls within a range of 170 degrees to 180 degrees, rendering is performed by moving the contour line by a predetermined distance in a normal direction.

The present invention enables representation to appear to have been drawn by a human hand in such a way as to add style lines to existing contour lines in order to represent a line style that belongs to various styles of non-photo realistic rendering.

While the invention has been shown and described with respect to the preferred embodiments, it will be understood by those skilled in the art that various changes and modifications may be made without departing from the scope of the invention as defined in the following claims.

What is claimed is:

1. An apparatus for processing an effect using style lines, comprising:
    a contour line creation unit for creating contour lines using polygons of a three-dimensional (3D) object and location information of a camera;
    a style line creation unit for putting edge lists, extracted at the time of creating the contour lines, into groups, and creating one or more style lines for each of the groups; and
    an effect processing unit for representing a line style by inserting the created style lines inside and outside a contour line corresponding to the group.

2. The apparatus of claim 1, wherein the style line creation unit performs grouping using curvature information between neighboring edges in the edge lists.

3. The apparatus of claim 1, wherein the style line creation unit sets a plurality of control points for a contour line related to each of the groups and creates each of one or more style lines for the group using the control points.

4. The apparatus of claim 3, wherein the control points comprise both end points and an intermediate point of the contour line.

5. The apparatus of claim 4, wherein the style line creation unit creates each of the style lines in consideration of curvature between the end points based on the three control points.

6. The apparatus of claim 1, wherein the style line creation unit provides a user interface capable of setting a number and length of style lines, and creates the style lines based on the number and length set by the user interface.

7. The apparatus of claim 1, further comprising a unit for determining a curvature value and brightness/darkness for each location of each group based on location information of each point and light location and providing the determined information to the effect processing unit.

8. The apparatus of claim 7, wherein the effect processing unit inserts a large number of style lines in a region having a curvature value greater than a predetermined value or in a relatively dark region, and inserts one or two style lines in other regions.

9. The apparatus of claim 1, wherein the effect processing unit comprises:
    an inside effect processing unit for inserting the created style lines inside the contour line; and
    an outside effect processing unit for inserting the created style lines outside the contour line.

10. The apparatus of claim 9, wherein the inside effect processing unit sets a sum of edges of the contour line to a maximum value and utilizes one or more style lines having a random length falling within the maximum value.

11. The apparatus of claim 10, wherein the inside effect processing unit divides the object into one or more relatively dark regions and one or more relatively bright regions, and represents a line style by inserting style lines having a random length in such a way as to insert one style line having a random length into the bright regions and insert a plurality of style lines having a random length into the dark regions.

12. The apparatus of claim 11, wherein the inside effect processing unit represents the style lines having random lengths so that an angle formed with respect to a start point of the edge group becomes a predetermined inclined angle.

13. The apparatus of claim 9, wherein the outside effect processing unit creates a plurality of style lines by readjusting the control points for the style lines, and performs rendering by inserting the plurality of style lines outside the contour line.

14. The apparatus of claim 13, wherein, when an angle formed between each of the inserted style lines and the contour line falls within a range from 170 degrees to 180 degrees, rendering is performed by moving the contour line by a preset distance in a normal direction.

* * * * *